United States Patent [19]

Loth et al.

[11] Patent Number: 4,915,497

[45] Date of Patent: Apr. 10, 1990

[54] STEREOSCOPIC MOTION PICTURE APPARATUS WITH HORIZONTAL FILM MOVEMENT

[75] Inventors: Stanislaw Loth, Nanuet, N.Y.; Anthony Petitto, Los Angeles, Calif.

[73] Assignee: Parallex Company, Inc., Los Angeles, Calif.

[21] Appl. No.: 381,300

[22] Filed: Jul. 18, 1989

[51] Int. Cl.⁴ .............................................. G03B 35/00
[52] U.S. Cl. ........................................ 352/57; 352/60; 352/69; 352/239; 352/65
[58] Field of Search ...................... 352/57, 60, 65, 69, 352/236

[56] References Cited

U.S. PATENT DOCUMENTS

| | | | |
|---|---|---|---|
| 1,324,122 | 12/1919 | Killman | 352/239 |
| 2,056,600 | 10/1936 | Crosier | 352/65 |
| 2,282,947 | 5/1942 | DeSherbinin | 352/60 |
| 3,019,698 | 2/1962 | Sheldon | 352/60 |
| 3,355,292 | 11/1967 | White | 352/239 |
| 4,464,028 | 8/1984 | Condon | 352/65 |

Primary Examiner—Monroe H. Hayes
Attorney, Agent, or Firm—Watson, Cole, Grindle & Watson

[57] ABSTRACT

An apparatus for photographing a pair of diagonally related left and right images of a stereoscopic image couple on to film frames of a horizontally moving 65 mm film having 15 film perforations per frame.

5 Claims, 2 Drawing Sheets

STEREOSCOPIC MOTION PICTURE APPARATUS WITH HORIZONTAL FILM MOVEMENT

RELATED APPLICATIONS

This application relates to U.S. Ser. No. 381,370, filed July 18, 1989, entitled Xenon Optical System For Cinematograph Projection, and to U.S. Ser. No. 381,299, filed July 18, 1989, entitled Geneva Drive Mechanism For Cinematograph Projection, both commonly owned herewith.

BACKGROUND OF THE INVENTION

This invention relates generally to a stereoscopic camera having an optical system which focuses, converges and exposes left and right images of a stereoscopic image couple on to 65 mm negative film, the left and right images respectively lying diagonally on adjacent film frames and having an aspect ratio of 3:1. The film moves horizontally with each frame having fifteen film feed perforations, the right image being formed on a full lower half of one film frame occupying one-half the width of that frame and having a length equal to the fifteen film perforations, the left image being formed on a full upper half of an adjacent film frame and occupying one-half the width of the adjacent frame and having a length equal to the fifteen film perforations.

And, the present optical system controls the stereo image through a double viewfinder which converges the stereo image pair into one full stereo effect.

The film shot on 65 mm film in the camera can be printed on 70 mm film having film images capable of being projected on to a wide screen of about 50 feet high and 150 feet wide.

The first of the modern wide-screen processes was Cinerama, a system using three lenses to take the entire picture and the recording of a scene on three strips of standard 35 mm film. Another wide-screen process is CinemaScope which combines stereophonic sound and a wide-screen picture on a single piece of film. CinemaScope uses an anamorphic lens on a standard 35 mm camera to horizontally compress or "squeeze" the image on the film vertically moving. A similar type of lens is used on the projector to "unsqueeze" the image in projection, thus restoring the image to its original size and shape. The release prints are 35 mm wide with the image pair located over and under on a vertically moving film having an aspect ratio of 2.55:1.

Todd-AO was a wide-screen process which departed from the standard 35 mm film, using 65 mm film in the camera and printed on 70 mm film having an aspect ratio of the projected image of 2.2:1. The stereoscopic image pair is located over and under on the vertically moving film as in the M-G-M 65 method of motion-picture production which uses 65 mm film in the camera. The film has a picture height of five perforations using a special lens which gives an anamorphic compression of 1.33 to the width. Contact prints 70 mm in size are made and projected in a 70 mm projector which has a lens with a 1.33:1 decompression ratio.

Super Panavision is another method using a 65 mm system but which has no anamorphic compression. Again, the over and under image pair is located on a vertically moving film.

U.S. Pat. No. 3,825,328 discloses an optical system for a stereoscopic motion picture camera for producing stereo pairs of adjacent, vertically spaced left and right images of the field of view with over and under images on a vertically moving film. The system includes a relay lens which forms two vertically aligned and separated, left and right images on the film, each image occupying approximately one vertical half of each frame area.

U.S. Pat. No. 3,551,036 discloses a method and apparatus for stereoscopic photography in which two 35 mm stereoscopic images are photographed in side-by-side relationship on a single 35 mm motion picture film frame by laterally compressing both images through a single anamorphic lens to approximately half of their normal width and projecting the compressed images in side-by-side relationship onto a single 35 mm film frame.

U.S. Pat. No. 4,178,090 discloses a three-dimensional camera device having a single lens for the photography of right and left images from an object transmitted as first and second light ray bundles from two positions separated by an interocular distance onto a single frame of a single film strip moving vertically with the stereoscopic image pair being formed over and under on each half frame.

U.S. Pat. No. 2,767,629 discloses an optical device for a stereoscopic camera with a horizontal film movement wherein several images of succeeding stereoscopic pairs are printed on the upper half of a single film frame, and the other images of the same succeeding stereoscopic pairs are printed on the lower half of an adjacent frame.

Yet another wide-screen process is known as the Imex system for a horizontally moving 70 mm film having 15 film perforations per frame. The left image of a stereoscopic pair occupies the full width and length of a frame, and the right image of the same stereoscopic pair occupies the full width and length of an adjacent frame yielding an aspect ratio of 1.33:1. The system requires a pair of large monocular side-by-side cameras. To effect fast film movement required for the system a cam projection arrangement is provided, or the film is moved by air flow.

SUMMARY OF THE INVENTION

It is an object of the present invention to provide a stereoscopic camera for forming left and right images of stereoscopic image couples onto film frames of a horizontally moving 65 mm film having 15 film feed perforations per frame and having an aspect ratio of 3:1. The camera has left and right objective lenses for filming the 65 mm negative film in a manner incapable of prior art optical systems. The present camera offers unique capabilities and advantages of stereo filming 65 mm film moving horizontally in a manner allowing for a single binocular camera with fast and accurate movement of the film developed into 70 mm picture film capable of being projected onto a wide screen of about 50 feet high and 150 feet wide. The camera avoids the need for anamorphic lens required for prior wide-screen processes, and shoots film capable of being fed accurately and reliably utilizing the film feed perforations uniformly spaced a standard distance from each other. And, the camera includes a viewfinder system capable of viewing the stereo image while the camera is not operating.

The optical system of the present camera has no limitations in using a wide range of different focal length lenses including special effects using the macro and miniature lenses. The present apparatus has its left and right objective lenses laterally spaced a predetermined interocular distance apart in a horizontal plane for respectively forming on adjacent film frames diagonally related left and right images of a stereoscopic image couple. The image beams pass directly through the right objective lens for forming the right image on a full lower half of one film frame such that the formed right image has an aspect ratio of 3:1 and occupies one-half the width of the one frame and has a length equal to the 15-film perforations.

The apparatus has a prism in the optical path of the left objective lens for deviating its beams for forming the left image on a full upper half of an adjacent film frame diagonal to the right image of the image pair such that the formed left image has an aspect ratio of 3:1 and occupies one-half the width of the adjacent frame and has a length equal to the fifteen-film feed perforations.

The present apparatus further has left and right viewfinder lenses respectively in the reflected optical paths of the left and right objective lenses for viewing a stereo image. An image viewing mirror and an image receiving ground glass are associated with each viewfinder lens. The prism has an upper reflective surface and is vertically movable for disposing such surface in the optical path of the left objective lens for reflecting the left image to the ground glass. A pellicle in the optical path of the right objective lens is provided for reflecting the right image to the ground glass, and the left viewfinder includes a viewfinder wedge for converging the left and right images from the ground glass.

The adjustable prism provided for the left objective lens has image-reflective surfaces and a predetermined thickness for equalizing the focal distance of the image passes from the objective lenses to the film frames.

The image ratio of 3:1 of the film shot according to the invention, together with a 70 mm wide picture film (65 mm wide negative film) at a fifteen perforation pull running horizontally, is three times wider (in the direction of film movement) than a standard 35 mm film. The present apparatus may further include a lens pair located behind the prism in the optical path of the left objective lens, the lens pair being afocal to the left objective lens for correcting edge focus of the light path through the prism.

Further provided according to the invention is the motion picture film adapted for horizontal movement, in the form of a film strip having a plurality of adjacent film frames with the strip having along opposite edges a plurality of spaced film feed perforations. Each frame has a length equal to 15 of such perforations, and the film strip is a negative 65 mm film or a 70 mm picture film having an aspect ratio of 3:1. The film has formed thereon a succession of right and left images of stereoscopic image couples, the right image of each couple occupying one-half the width and the full length of one of the film frames on one side of the longitudinal center line of the film. The left image of each couple is diagonally related to the right image and occupies one-half the width and the full length of another of the frames adjacent such one frame on the side of the center line opposite such one side. Thus, the picture film is capable of projecting the succession of right and left images in stereo, and is likewise capable of projecting the succession of right images only or of the left images only in non-stereo.

Other objects, advantages and novel features of the invention will become more apparent from the following detailed description of the invention when taken in conjunction with the accompanying drawings.

DETAILED DESCRIPTION OF THE INVENTION

Figure 1:
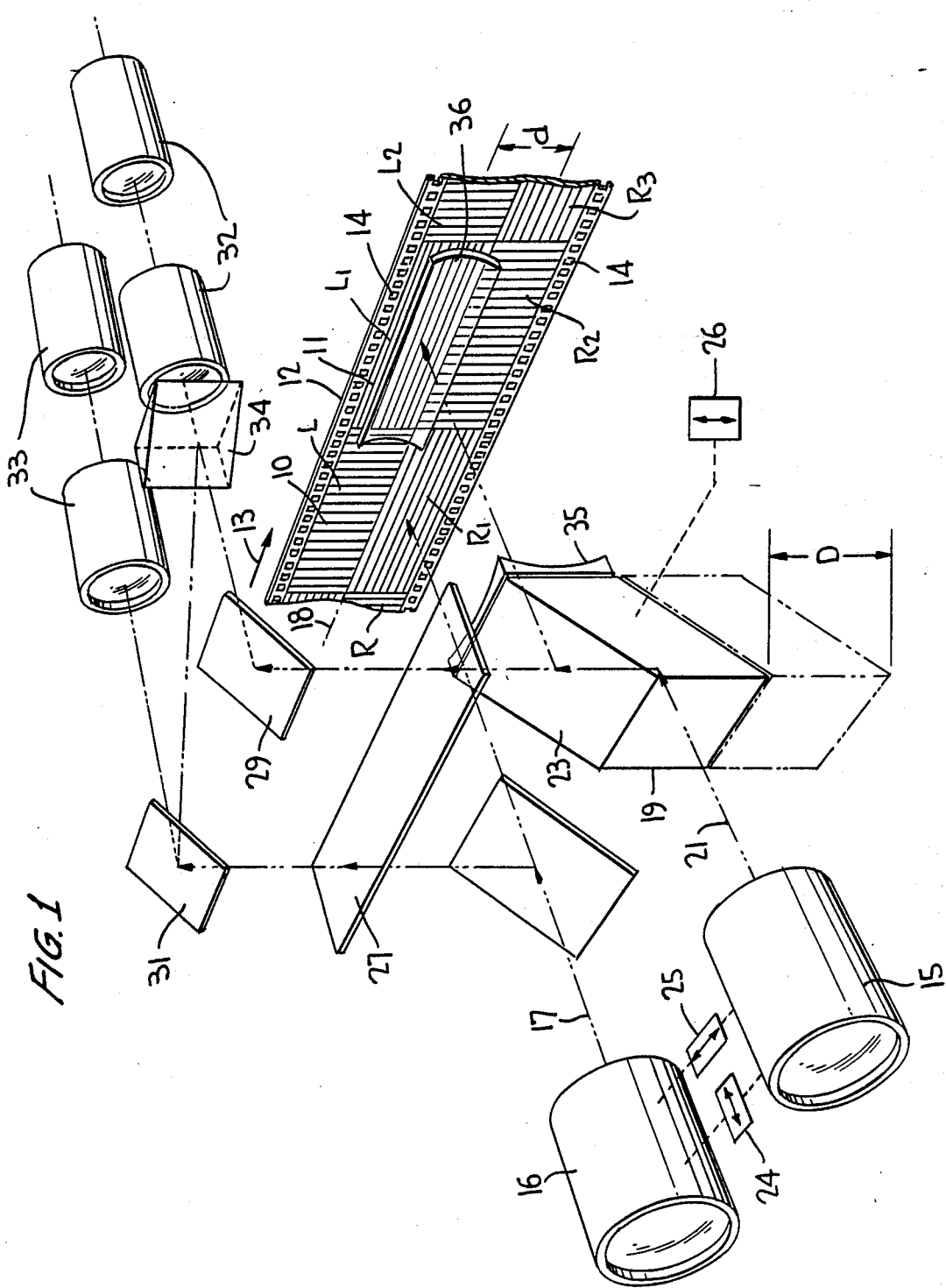
FIG. 1 is an expanded view, in perspective, of the apparatus according to the invention.

Turning now to the drawings wherein like reference characters refer to like and corresponding parts throughout the several views, the stereoscopic motion picture apparatus according to the invention is shown in FIG. 1 with elements not illustrated such as a camera housing, shutter, gate, film chamber, intermittent film movement, etc. as they need not be shown for an understanding of the invention.

The 65 mm negative film shot with the present camera is intended to be developed as a 70 mm picture film for viewing with the projector disclosed in one of the aforementioned related applications entitled Xenon Optical System For Cinematograph Projection. And, the camera and picture films according to the invention are intended to be intermittently driven horizontally by an improved Geneva drive disclosed in the other of the aforementioned related applications entitled Geneva Drive Mechanism For Cinematograph Projection. The entirety of the disclosures of both the aforementioned related applications are therefore specifically incorporated herein by reference. The apparatus is for photographing a pair of diagonally related left and right images L,R, $L_1,R_1$, $L_2,R_2$, $L_3,R_3$, etc., each of a stereoscopic image couple on to film frames such as 10 and 11 of a 65 mm film strip 12 intended for movement in a horizontal direction (shown by arrow 13) moving from right to left when viewed in FIG. 1. The directions right and left used in the present description are those of the right and left hands of an observer standing upright and positioned on that side of film 12 away from the objective lenses and facing toward such lenses.

The film strip 12 has formed along its opposite edges a plurality of spaced film feed perforations 14. Each of the film frames 10, 11 has a length (in the direction of arrow 13) equal to fifteen perforations 14 at a standard spacing used for motion picture camera and projector pull-down film feed perforations. The camera has left and right objective lenses 15 and 16 laterally spaced a predetermined interocular distance apart and lying in a horizontal plane for respectively forming the left and right images of stereoscopic image couples on the adjacent film frames. The image beams pass directly through right objective lens 16 along its optical path 17 for forming the right image $R_1$ of a stereoscopic image couple $L_1$, $R_1$ on a full lower half of film frame 10 on one side of longitudinal centerline 18 of the film such that the formed right image has an aspect ratio of 3:1 and occupies one-half the width of frame 10 and has a length equal to the fifteen film perforations 13 which define the length of each film frame.

Figure 2:
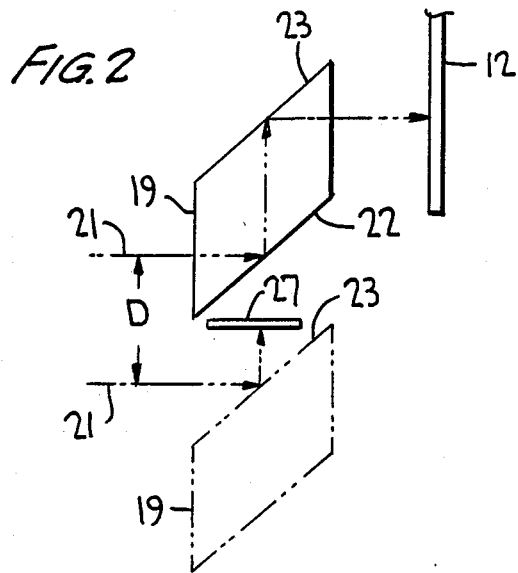
FIG. 2 is a side elevational view of the prism of the apparatus according to FIG. 1 shown in two vertically adjusted positions.

A glass prism 19 is located in one adjusted position in the optical path 21 of left objective lens 15 of deviating image beams for forming a left image $L_1$, of the stereoscopic image pair $R_1$, $L_1$, on a full upper half of adjacent film frame 11 diagonally related to the right image $R_1$ such that the formed left image $L_1$ has an aspect ratio of 3:1 and occupies one-half the width of adjacent frame 11 on a side of longitudinal centerline 18 opposite image $R_1$, and has a length equal to the fifteen film perforations 14. The prism 19 has upper and lower image reflective surfaces 22, 23 (see FIG. 2) for deviating the left image beams from optical path 21 for forming images L. And, the prism has a predetermined thickness for also equalizing the focal distance of the image passes from both objective lenses to the film frames.

Focus adjusting means 24, of some standard variety, is connected to both objective lenses for shifting the objective lenses together along optical paths 17 and 21 for focusing the left and right image beams.

And, convergence means 25, of some standard variety, is connected to both objective lenses for adjusting the interocular distance of the objective lenses relative to each other from 65 mm to 70 mm of the center point of the lenses, and a convergence ratio of 15 mm to effect image convergence.

The present apparatus likewise includes a double viewfinder which converges two stereo images into one full stereo effect. A stereo image can thus be seen through the viewfinder when the camera is not operating. For this purpose, prism shifting means 26, of some standard type, is connected to prism 19 for vertically shifting the prism from its upper position shown in FIG. 2 to a lower position shown in FIG. 2 through a distance D which is equal to the distance d between the centerlines of the upper and lower images L and R. In the lower position of the prism, the left image is focused through lens 15 and is reflected from top reflective surface 23 of the prism (FIG. 2), which can be a front mirror surface, for reflecting the left image onto a ground glass 27.

A pellicle 28, capable of reflecting a part of the image falling upon it and transmitting the rest of the image through it, is mounted in optical path 17 of the right objective lens 16 for reflecting the right image also to the ground glass.

Image viewing mirrors 29 and 31 are respectively located in the reflected optical paths of the objective lenses. Left and right double viewfinder lenses 32 and 33 are respectively located along the optical paths reflected by mirrors 29 and 31 to facilitate viewing of the left and right images from the ground glass. A viewfinder glass wedge 34 is mounted along the optical path of viewfinder lenses 32 for converging the left and right ground glass images into one stereo image captured by lenses 15 and 16.

Figure 4:
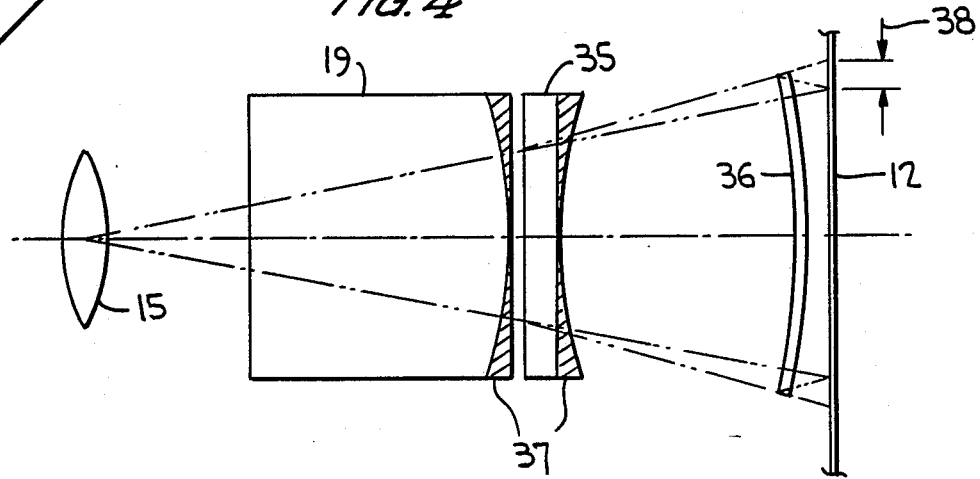
FIG. 4 is a top plan view of the left objective lens, the prism and the lens pair of FIG. 3 illustrating one of the functions capable of the FIG. 1 apparatus.

When the camera is operating, glass prism 19 is located in its upper position shown in FIG. 1 for reflecting the left images to form images L at the upper halves of adjacent film frames diagonally in relationship to the right images R formed on the lower halves of adjacent film frames. The reflected images through prism 19 may, however, create a difference in focus between the center of the image and the edges of the image. To compensate for this, a plano-convex correction lens 35 is positioned behind prism 19, and a concave correction lens 36 coacts with lens 35. The rear correction lens 35 corrects the angular edge focus difference 37 (schematically shown by the shading in FIG. 4), and lens 36 compensates this difference to lens 35 by the image edge difference 38.

Figure 3:
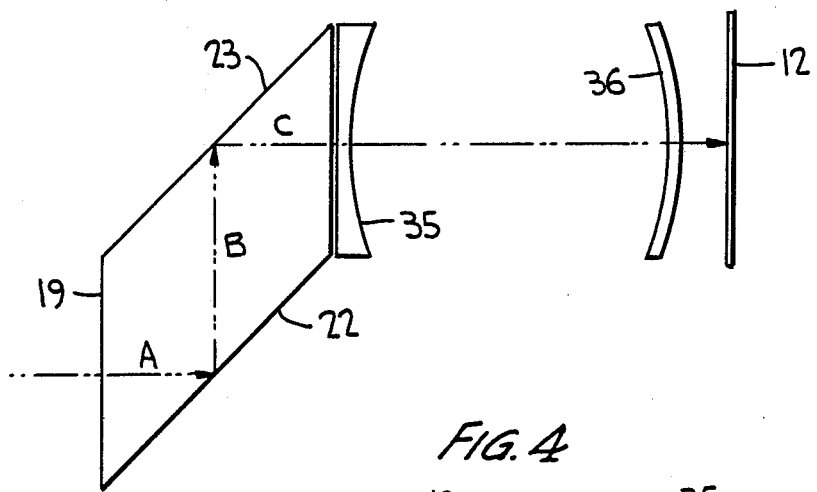
FIG. 3 is a side elevational view of the prism and of a lens pair located behind the prism in the apparatus according to FIG. 1.

The lens pair 35, 36 is afocal to objective lens 15. The mirror image shading on prism 19 illustrates the effect of the angular difference between the flat surface of prism 19 and the curvature of lens 35. Thus, the image pass A, B, C (FIG. 3) through prism 19 is different between the center and the edges thereof, i.e., the pass at the edges thereof is longer. It would be equal if the rear side of the prism was curved as shown by shading 37 thereon.

To compensate the difference of the prism image path, concave lens 35 is provided having a curve 37 similar to that shown at 37 on the prism, i.e., about $-3.5$ diopter.

Paired with lens 35 is the meniscus lens 36, about $+0.5$ diopter. Lens 36 corrects the focus and magnification of the image through the peripheral distance 38. The optical system according to the invention has no limitations on using any film lens with different focal lengths. Also, the system controls the stereo image through the aforedescribed double viewfinder which converges two stereo images into one full stereo effect.

The stereoscopic image pairs are formed diagonally on the respective upper half and lower half of adjacent film frames and occupy the full half width and full length of each film frame. Film 12 is a 65 mm negative film used in the camera and is developed as 70 mm film for projection. The camera having an objective lens pair is of simple and compact construction capable of not only shooting 65 mm film moving horizontally and capable of being projected onto a wide screen without the need for bulky and additional equipment as heretofore required, but likewise permits stereo images to be viewed while the camera is not operating. The aspect ratio of 3:1 achieved for the images produced on the present film give rise to wide screen stereoscopic and non-stereoscopic projection depending upon whether the stereo pairs are projected as stereoscopic image couples or whether only one of each image pair is projected.

Obviously, many modifications and variations of the present invention are made possible in light of the above teachings. It is therefore to be understood that within the scope of the appended claims the invention may be practiced otherwise than as specifically described.

What is claimed is:

1. An apparatus for photographing a pair of diagonally related left and right images of a stereoscopic image couple on to film frames of a horizontally moving 65 mm film having fifteen film feed perforations per frame, comprising, left and right objective lenses laterally spaced a predetermined interocular distance apart and lying in a horizontal plane for respectively forming on adjacent film frames left and right images of a stereoscopic image couple, the image beams passing directly through said right objective lens for forming the right image on a full lower half of one film frame such that the formed right image has an aspect ratio of 3:1 and occupies one-half the width of the one frame and has a length equal to the fifteen film feed perforations, prism means in the optical path of said left objective lens for deviating image beams for forming the left image on a full upper half of an adjacent film frame diagonal to said right image such that the formed left image has an aspect ratio of 3:1 and occupies one-half the width of the adjacent frame and has a length equal to the fifteen film feed perforations.

2. The apparatus according to claim 1, further comprising left and right viewfinder means respectively in the optical paths of said left and right objective lenses for viewing a stereo image, each said means comprising a viewfinder lens, an image viewing mirror and an image receiving ground glass, said prism means having an upper reflective surface and being vertically shiftable for disposing said surface in the optical path of said left objective lens for reflecting the left image to the ground glass, a pellicle in the optical path of the right lens for reflecting the right image to the ground glass, and said left viewfinder means including a viewfinder wedge for converging the left and right images from the ground glass.

3. The apparatus according to claim 1, wherein said prism means has upper and lower image reflective surfaces for deviating the left image beams, and a predetermined thickness for equalizing the focal distance of the image passes from the objective lenses to the film frames.

4. The apparatus according to claim 1, wherein a lens pair is located behind the prism means in the optical path of the left objective lens, the lens pair being focal to the left objective lens for correcting edge focus of the light path through said prism.

5. A motion picture film adapted for horizontal movement comprising a film strip having a plurality of adjacent film frames, said strip having along opposite edges a plurality of spaced film feed perforations, each said frame having a length equal to fifteen of said perforations, said film strip having one of an undeveloped film width of 65 mm and a developed film width of 70 mm for an aspect ratio of 3:1, said film strip having formed thereon a succession of right and left images of stereoscopic image couples, said right image of each couple occupying one-half the width and the full length of one of said frames on one side of the longitudinal centerline of said film, said left image of each couple being diagonally related to said right image and occupying one-half the width and the full length of another of said frames adjacent said one frame on the side of said centerline opposite said one side, whereby the developed film is capable of projecting the succession of the right and left images in stereo, and is capable of projecting the succession of the right images only or of the left images only in non-stereo.

* * * * *